May 23, 1967  C. MARCONI, JR  3,321,024
FRICTION DRIVE FOR OUTBOARD MOTORS
Filed Feb. 23, 1966
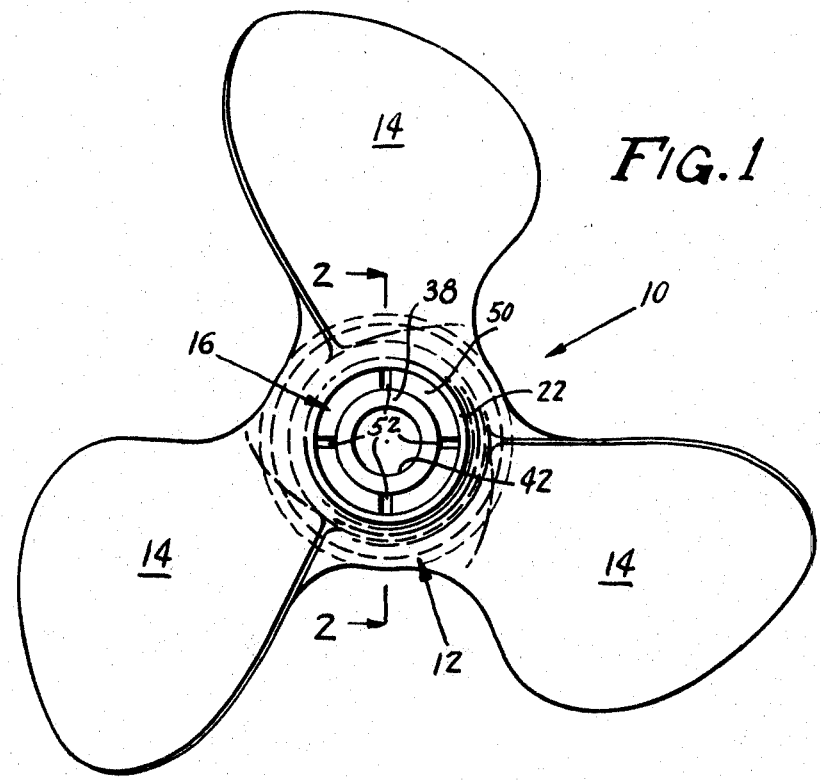
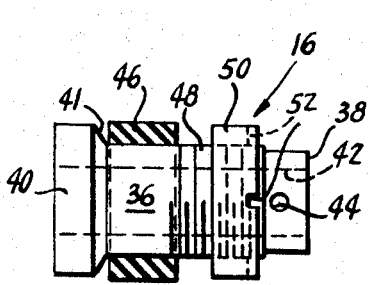
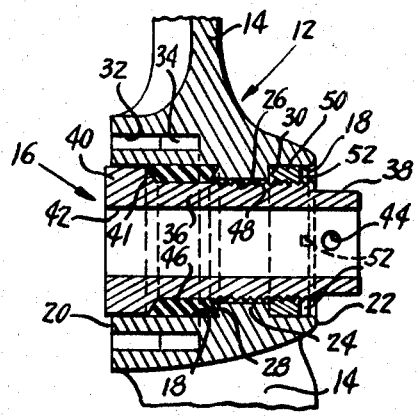
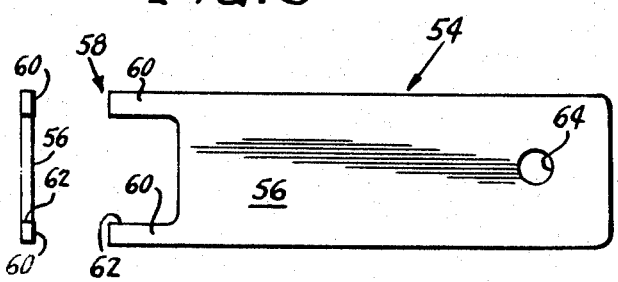
INVENTOR.
CAESAR MARCONI, JR.
BY
ATTORNEYS.

United States Patent Office 3,321,024
Patented May 23, 1967

3,321,024
FRICTION DRIVE FOR OUTBOARD MOTORS
Caesar Marconi, Jr., 2724 Sarah St.,
Franklin Park, Ill. 60131
Filed Feb. 23, 1966, Ser. No. 529,566
1 Claim. (Cl. 170—160.54)

This invention relates to a frictional drive connection for outboard motors and the like, and more particularly to an improved frictional drive connection for transmitting power under normal conditions and providing a certain amount of slippage under high stress conditions.

An object of the instant invention is to provide a frictional drive connection for outboard motors by which a propeller is normally driven without slippage for moving an associated vessel through a body of water, but in the event the propeller should strike a stationary object while being driven, it may cease or slow rotation as required, while the drive shaft connected thereto may continue its rotation in order to avoid damage to the driving connection, thus obviating the need of a shear pin.

Still another object of the instant invention is the provision of a frictional drive connection which is inexpensive to construct, easy to install, and which may be tightened to produce substantially any frictional forces desired.

A further object of the instant invention is to provide a frictional drive connection including a deformable bushing which may be compressed against the inner walls of an adjacent aperture for securing together a propeller hub and a rotatable drive shaft.

Other objects and advantages of the instant invention, as well as the invention itself, reside in the combinations of elements, arrangements of parts, and features of construction and operation, all as will be more fully pointed out hereinafter and disclosed in the accompanying drawing wherein there is shown a preferred embodiment of this inventive concept.

In the drawing:

FIGURE 1 is a rear elevational view of a propeller hub mounting a plurality of propellers and a frictional drive connection, all as in accordance with the principles of the instant invention;

FIGURE 2 is a cross-sectional view of the propeller of FIGURE 1 taken substantially along line 2—2 thereof viewing in the diretcion of the arrows;

FIGURE 3 is a side elevational view of the frictional drive connection oft he instant invention with a deformable bushing being shown in cross section;

FIGURE 4 is a front elevational view of a wrench which may be utilized to secure together the device of FIGURES 1 and 2; and FIGURE 5 is an end elevational view of the wrench of FIGURE 4.

Referring now to the drawing in detail, wherein like reference characters designate like elements throughout the several views thereof, there is indicated generally at 10 the propeller for outboard motors or the like made of plastic, metal or any other suitable material having as its major components a hub shown generally at 12 from which outwardly extends a plurality of propeller blades 14 and interiorly of which is mounted a frictional drive connection designated generally at 16.

Hub 12 includes a substantially ogive body forming a central circular aperture 18 substantially perpendicular to blades 14 extending from a rear end 20 of hub 12 to a forward end 22 thereof. Hub 12 forms a circumferential or peripheral ledge 24 provided interiorly of aperture 18. As may be seen in FIGURE 2, ledge 24 forms a central opening 26 coaxial with aperture 18, a rearwardly facing inwardly inclined abutment 28 and a forwardly facing vertical abutment 30 with frictional drive connection 16 being received by aperture 18 and opening 26. Hub 12 also forms an annular circular groove 32 in which is mounted a plurality of rearwardly extending slats 34 for engagement with a rotatable hub of an associated motor.

Frictional drive connection 16 includes a cylindrical shank 36 integral with a forward reduced diameter extension 38 and a rearward shoulder forming cylindrical plate 40 having a forwardly disposed beveled edge 41. In order to accommodate a rotatable drive shaft, shank 36, extension 38 and shoulder 40 form a central passageway 42 substantially perpendicular to propeller blades 14 with extension 38 forming a pair of transverse aligned apertures 44 for receiving a pin in order to secure a rotatable drive shaft to frictional drive connection 16.

Received about shank 36 adjacent shoulder 40 is an annular deformable bushing 46 preferably made of a resilient material, such as rubber or the like with the combined thickness of shank 36 and bushing 46 being slightly greater than the diameter of shoulder 40. Shank 36 is formed with a plurality of male threads 48 with a circular nut 50 being provided with female threads engageable with threads 48. Nut 50 is provided with a plurality of radially extending slots 52 for engagement with a tightening tool as more fully explained hereinafter.

In the assembly of frictional drive connection 16 and propeller 10, bushing 46 will be slidably received by shank 36 as may be seen in FIGURE 1. Shank 36, extension 38, shoulder 40 and bushing 46 will be inserted into aperture 18 of hub 12 with opening 26 of ledge 24 receiving shank 36. Nut 50 is then inserted over extension 38 onto threads 48, with the threads of shank 36 and circular nut 50 preferably being left-handed such that nut 50 will be continuously tightened by the rotation of propellers 14 in the conventional direction.

A tightening tool designated generally at 54 is provided to tighten nut 50 and includes a planar metallic body 56 having a bifurcated end designated generally at 58 including a pair of spaced apart legs 60 forming a deep recess 62 therebetween. As may be apparent, legs 60 are inserted into radial slots 58 with body 56 being rotated in a counterclockwise direction when viewing propeller 10 as in FIGURE 1. Body 56 may be provided with a suitable aperture 64 adjacent the end thereof for receiving a screwdriver or the like for tightening nut 50.

The tightening of nut 50 will deform bushing 46 such that it becomes closely engaged with aperture 18, forwardly disposed beveled edge 41 of shoulder 40 and rearwardly inclined abutment 28 of ledge 24. It will be seen, therefore, that under normal operating conditions, the rotation of frictional drive connection 16 will result in the rotation of hub 12 and propeller blades 14. In the event that blades 14 become fouled or engage a stationary object, slippage will occur between shank 36 and bushing 46 and between bushing 46 and aperture 18 such that blades 14 may cease or slow their rotary movement.

In the connection of frictional drive connection 16 to an outboard motor or the like, the rotatable drive shaft thereof may be inserted into central passageway 42 with a cotter key or shear pin being inserted through apertures 44 and the shaft. Since the threads of circular nut 50 and shank 36 are preferably lefthanded, it will be apparent that nut 50 is self-tightening. It should also be noted that circular nut 50 is substantially coplanar with forward end 22 of hub 12. Accordingly, nut 50 may be reached easily if an obstruction is hit loosening the frictional connection. The outboard motor need only be raised in a conventional manner with tightening tool 54 being utilized to tighten nut 50.

It is now seen that there is herein provided an improved frictional drive connection for outboard motors and the like having all the objects and advantages of the instant invention and others, including many advantages of great practical utility and commercial importance.

Since many embodiments may be made of the instant inventive concept, and since many modifications may be made of the embodiment hereinbefore shown and described, it is to be understood that the foregoing is to be interpreted merely as illustrative and not in a limiting sense.

I claim:

An outboard motor propeller and clutch therefor comprising an elongated propeller hub for a plurality of propeller blades, said hub having opposed forward and rearward ends and a central aperture extending between said ends, a peripheral ledge formed by said hub extending into said aperture intermediate the ends thereof and forming a smaller opening, said ledge including a rearwardly facing end and a forwardly tapered abutment having a forwardly extending knife edge thereon, and means for connecting said hub to a drive shaft, said means including a hollow shank to releasably receive said drive shaft therethrough, said shank being of lesser size than said aperture and being positioned in said aperture to extend through said opening, said shank being closely received within said opening, said shank carrying a threaded end and an opposite end forming a peripheral shoulder of substantially the same size as said aperture, said shoulder including a rearwardly extending beveled edge, means on said shank for connection to a rotatable drive shaft, a deformable annular bushing having opposed front and rear ends, said bushing being received on and peripherally engaging said shank, said bushing being disposed within said aperture and extending between said shoulder and said ledge with said front end of said bushing engaging said beveled edge and its rear end being engaged by said forwardly extending knife edge, and a threaded nut received on said threaded end of said shank and engaging said rearwardly facing end of said ledge, whereby tightening of said nut compresses said bushing in said aperture and controls the torque delivered by said shaft to said propeller.

References Cited by the Examiner
UNITED STATES PATENTS

| | | |
|---|---|---|
| 2,543,396 | 2/1951 | Wolff. |
| 2,569,144 | 9/1951 | Benson. |
| 2,642,730 | 6/1953 | Snyder _____ 170—135.75 X |
| 3,047,074 | 7/1962 | Rielag _____ 170—160.54 |
| 3,113,625 | 12/1963 | Conover _____ 170—160.54 X |
| 3,144,909 | 8/1964 | Hart et al. _____ 170—160.54 X |

MARTIN P. SCHWADRON, *Primary Examiner.*

EVERETTE A. POWELL, Jr., *Examiner.*